(12) United States Patent
Forster

(10) Patent No.: US 8,672,222 B2
(45) Date of Patent: Mar. 18, 2014

(54) INFRASTRUCTURE-MOUNTED RFID TAGS

(75) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 734 days.

(21) Appl. No.: 12/772,252

(22) Filed: May 3, 2010

(65) Prior Publication Data

US 2011/0266342 A1    Nov. 3, 2011

(51) Int. Cl.
*G06Q 30/00* (2012.01)
(52) U.S. Cl.
USPC .......................................... 235/385; 235/375
(58) Field of Classification Search
USPC .......... 235/375, 385, 492, 380, 382, 486, 487
See application file for complete search history.

(56) References Cited

U.S. PATENT DOCUMENTS

| | | | |
|---|---|---|---|
| 5,565,858 A * | 10/1996 | Guthrie | 340/10.33 |
| 6,486,769 B1 * | 11/2002 | McLean | 340/10.32 |
| 7,212,121 B2 * | 5/2007 | Hashimoto et al. | 340/572.1 |
| 7,345,576 B2 * | 3/2008 | Allen et al. | 340/10.2 |
| 7,510,110 B2 * | 3/2009 | Pietrzyk et al. | 235/375 |
| 7,513,425 B2 * | 4/2009 | Chung | 235/385 |
| 8,040,220 B2 * | 10/2011 | Sakai et al. | 340/10.1 |
| 2007/0194936 A1 * | 8/2007 | Hoshina | 340/572.8 |
| 2008/0231451 A1 * | 9/2008 | Kamel | 340/572.1 |
| 2010/0123559 A1 * | 5/2010 | Wilkinson et al. | 340/10.4 |
| 2010/0176922 A1 * | 7/2010 | Schwab et al. | 340/10.1 |
| 2012/0133490 A1 * | 5/2012 | Downie et al. | 340/10.1 |

* cited by examiner

*Primary Examiner* — Thien M Le
(74) *Attorney, Agent, or Firm* — Avery Dennison Corporation

(57) ABSTRACT

Infrastructure-mounted RFID-readable tags or transponders are provided for various applications. Such infrastructure tags may be employed in combination with RFID-readable product tags and an RFID reader for an improved inventory-management system which requires both types of tags to be scanned to constitute a successful product count. Infrastructure tags may also be employed as "read" or "no-read" tags in an RFID read field. The infrastructure tags of the RFID read field are combined with an RFID reader which is dynamically adaptable during initial set-up and use to improve the performance of the read field. When a perturbing object is detected in the read field, one or more performance parameters of the reader are adjusted to overcome any perturbing influence caused by the object.

26 Claims, 4 Drawing Sheets

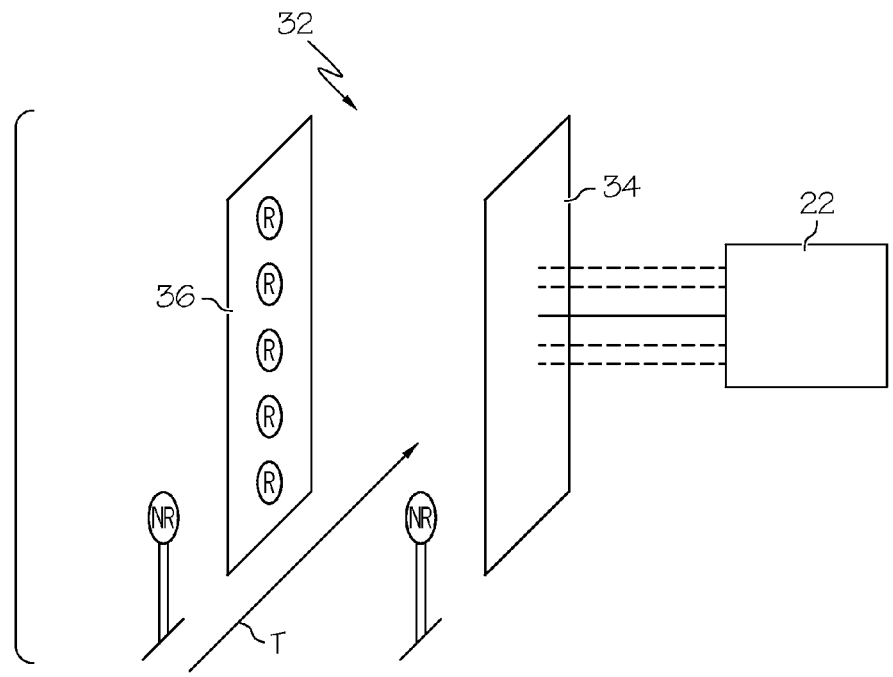
FIG. 4
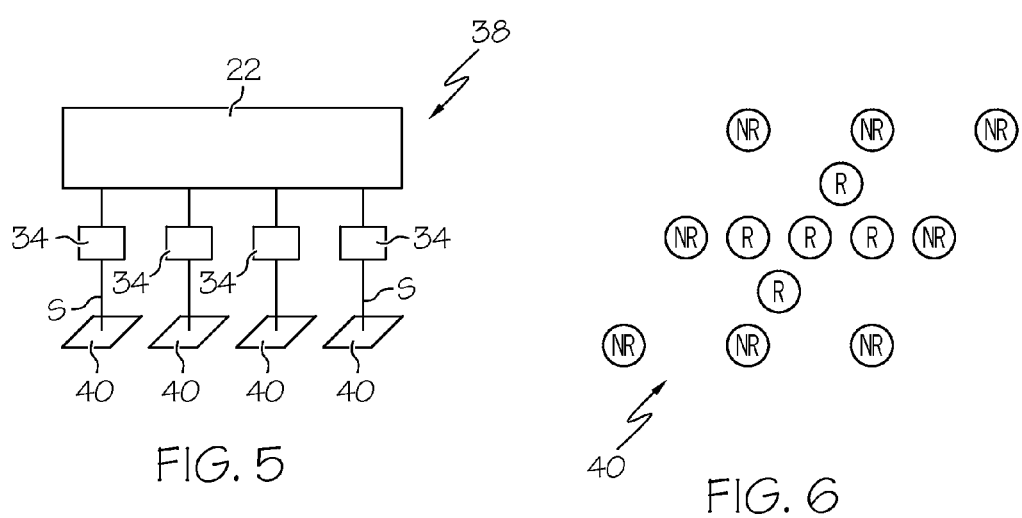
FIG. 5
FIG. 6

INFRASTRUCTURE-MOUNTED RFID TAGS

BACKGROUND

1. Field of the Disclosure

The present subject matter relates to radio frequency identification ("RFID") devices. More particularly, the present subject matter relates to infrastructure-mounted RFID tags for commercial and/or industrial installations, such as inventory, security, processing and production applications.

2. Description of Related Art

It is known to employ RFID technology in an area (e.g., a store or other retail environment) for various purposes. In one example, an RFID reader is associated with a point-of-sale location or check-out counter of a store and detects a tag associated with an item being purchased to register the price of the item. In another example, an RFID-readable tag or transponder is attached to each piece of merchandise in a store or storage area. The tags are scanned using an RFID reader to keep proper count of the product inventory. In yet another example, RFID technology is used as a security measure. In a typical RFID-based security system for a store, one or more RFID readers are installed adjacent to an exit, while guard tags are associated with (often by means of a hangtag or label) individual items sold in the store. When a customer purchases an item, the cashier will either remove or otherwise deactivate the guard tag associated therewith. If the guard tag has not been removed or deactivated (e.g., if a customer attempts to remove the item from the store without paying for it), the RFID reader or readers in the read field will sense the guard tag as the customer is exiting the store. Upon sensing the guard tag, the read field causes an alarm or other alert to trigger, thereby alerting store personnel to possible theft of the item.

Although the above-described systems are widespread, there are certain disadvantages. For example, when metal is placed in range of the RFID reader, it may act as a secondary radiator, causing unwanted detection events. Other common objects, such as liquids, animals or humans, can also perturb the read field.

Additionally, while it is known to use infrastructure-mounted RFID technology for various applications, the potential of infrastructure-mounted RFID technology has not yet been fully realized and there are still numerous applications and settings in which they might be advantageously employed but which have not yet been accomplished successfully.

SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, an RFID-based inventory management system comprises an RFID-readable product tag associated with a piece of merchandise, an RFID-readable infrastructure tag associated with a fixed location, and an RFID reader capable of sending signals to and receiving return signals from the product tag and the infrastructure tag.

In another aspect, an RFID-based method of counting items in an area comprises providing an item including an RFID-readable product tag and an infrastructure tag associated with a fixed location in the area. The product and infrastructure tags are scanned using an RFID reader to obtain information about the tags.

In yet another aspect, an RFID-based read field comprises an RFID reader adapted to emit a signal, an RFID-readable infrastructure tag adapted to emit a return signal or non-signal upon receiving a signal from the RFID reader, and a system controller. The system controller is programmed to compare any return signal or non-signal received by the RFID reader to an expected return signal or non-signal and adjust at least one of the performance parameters of the RFID reader if the return signal or non-signal is different from the expected return signal or non-signal.

In another aspect, a method of operating an RFID-based read field comprises providing an RFID-readable infrastructure tag and an RFID reader. The RFID reader emits a signal and, if the tag receives the signal from the RFID reader, the tag emits a return signal or non-signal. Any return signal or non-signal received by the RFID reader is compared to an expected return signal or non-signal. If the return signal or non-signal is different from the expected return signal or non-signal, at least one performance parameter of the RFID reader is adjusted.

According to another aspect, RFID systems and methods comprise multiple RFID tags having differing sensitivities and/or different radiation patterns to tailor the system and method to meet desired objectives.

BRIEF DESCRIPTION OF THE DRAWINGS

FIG. 4 is a schematic diagram of a dynamic RFID read field in a portal installation;

FIG. 5 is a schematic diagram of ceiling-mounted components of an alternative dynamic RFID read field in a portal installation;

FIG. 6 is a schematic diagram of floor-mounted components of a read field suitable for use in combination with the installation of FIG. 5.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

In retail stores, an accurate count of the products on display and/or in storage is important. In a typical inventory system, individual items include an RFID-readable tag or transponder and are counted by a staff member moving around the store area and using a handheld RFID reader to read each RFID tag.

The accuracy of the count depends on the staff member visiting all of the locations in which the items are stored or displayed, taking sufficient time at each location to capture the highest possible percentage of tags present, and orienting and moving the RFID reader around and between the items in an optimal fashion. Ideally, with sufficient training, the staff member will do a complete and thorough job, but the quality of day-to-day performance can vary and may drop over time.

Figure 1:
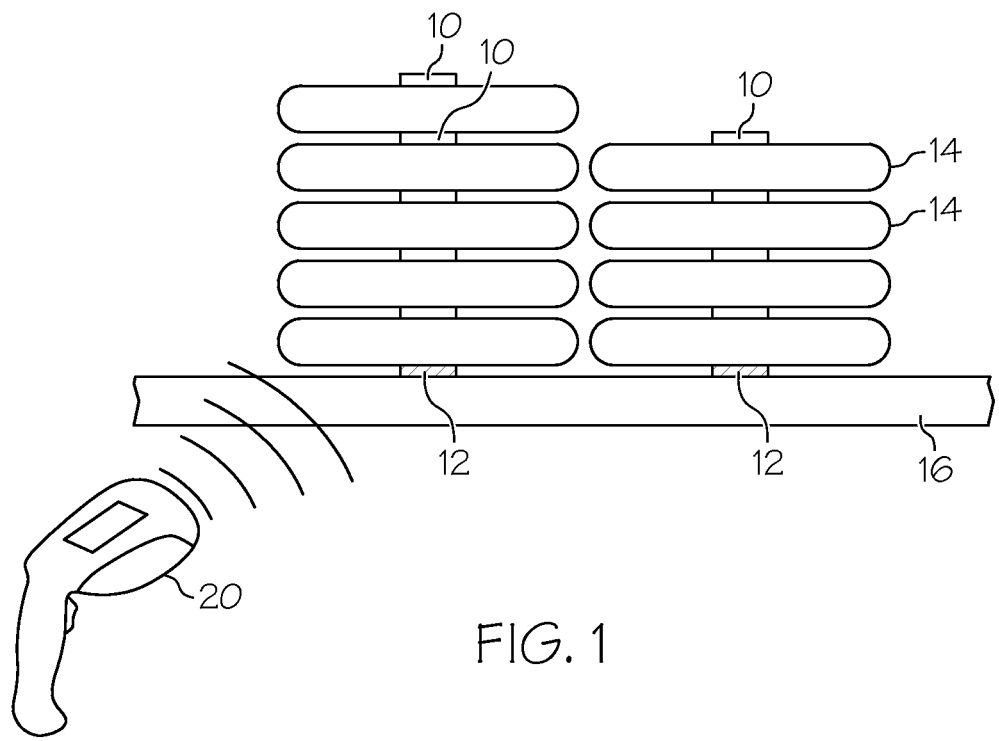
FIG. 1 is a front elevational view of an RFID-based inventory system employing product tags and shelf-mounted infrastructure tags.
Figure 2:
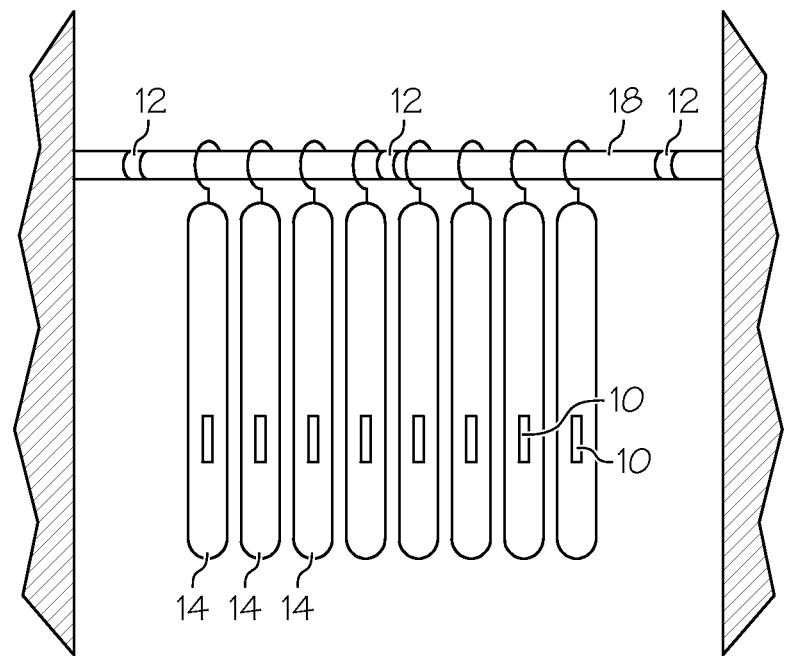
FIG. 2 is a front elevational view of an RFID-based inventory system employing product tags and bar-mounted infrastructure tags.

In contrast to known inventory systems, inventory systems according to the present disclosure employ two types of RFID-readable tags or transponders 10 and 12 (FIGS. 1 and 2). The first type is a product tag 10, which is associated with an individual item or piece of merchandise 14. The product tag 10 may be associated with the item 14 by any of a number of means, such as a hang card or an adhesive material. The product tag 10 may contain information related to the item 14, such as its SKU or price. Typically, the product tags 10 are not unique, with all of the same items having the same product tag. The second type of RFID tag is an infrastructure tag 12, which is affixed to a fixed location of the storage or display area itself. For example, FIG. 1 shows a pair of infrastructure tags 12 secured to a shelf unit 16 supporting the items 14. FIG. 2 shows three infrastructure tags 12 spaced along the length of a bar 18 supporting the items 14. The infrastructure tags 12 may be unique (e.g., by providing them with unique identities) and contain information about their location within the store/storage area.

According to the present disclosure, a count of the items in an area is carried out by a staff member moving around the store area and using a handheld RFID reader 20 (FIG. 1) to read the product tags 10 and the infrastructure tags 12 (i.e., by sending a signal to the tags and receiving a return signal back from the tags). In contrast to known systems, this is a greater assurance that the count will be done properly, as it requires the staff member to move to the locations dictated by the infrastructure tags 12. A system controller or integrator associated with the reader 20 may contain a database of the information associated with each infrastructure tag 12, meaning that it can recognize the count as "incomplete" if a particular infrastructure tag 12 is not scanned by the RFID reader 20. Additionally, the use of both product tags 10 and infrastructure tags 12 allows the system controller to determine (either generally or specifically) where a particular item 14 is located. For example, the system controller may log the time at which a tag (either a product tag 10 or an infrastructure tag 12) is read by the RFID reader 20. If a product tag 10 is read at approximately the same time as an infrastructure tag 12, it can be deduced that the product tag 10 (and, hence, the associated item 14) is located close to the location identified by the infrastructure tag 12. The time between scanning the two tags, the time at which another infrastructure tag 12 is scanned, the geometry of the store area, and other factors may be considered by the system controller to more accurately ascertain the location of a particular item 14.

The inventory system may be provided such that the information carried by a particular infrastructure tag 12 may be relevant or make reference to the information carried by another infrastructure tag 12. In one embodiment, the infrastructure tags 12 contain information which cooperates with the RFID reader 20 and system controller to dictate a particular order in which the infrastructure tags 12 must be read. For example, the three infrastructure tags 12 of FIG. 2 may carry unique sequence numbers (e.g., #1 for the leftmost tag, #2 for the middle tag, and #3 for the rightmost tag), such that reading them consecutively from left to right (i.e., #1 and then #2 and then #3) is the only way for the system controller to register a "proper" count, while reading them in any other order (such as right to left or #3 to #2 to #1) will register an "improper" count. Alternatively, rather than any sequencing information being carried by the infrastructure tags 12, the system controller may be programmed with the necessary sequencing information and protocol.

The infrastructure tags 12 may have different sensitivities and/or radiation patterns, either by having tags with different settings or tags of different designs. The use of different sensitivities allows a system integrator or controller to control how close the RFID reader 20 must be to register a particular tag 12. For example, a minimum received signal strength indication ("RSSI") may be required, such that the inventory tag 12 will not register as being read by the reader 20 until the reader 20 is sufficiently close to the inventory tag 12 that the RSSI surpasses the minimum value.

According to another aspect of the present disclosure, infrastructure-mounted RFID-readable tags or transponders are employed in a dynamic RFID read field. As discussed above, the presence of various materials (including metals and liquids) in an RFID read field may alter the nature of the signals transmitted in the read field. If the return signal received by the RFID reader is different from what the reader is expecting, the read field may not function as intended. By providing an RFID read field which is dynamic in nature (i.e., capable of changing or adapting in response to the presence of a perturbing object in the read field), the number of read errors is decreased.

In systems according to this aspect of the present disclosure (several of which are illustrated in FIGS. 3-7), an RFID read field is comprised of at least one RFID reader 22, at least one infrastructure-mounted RFID-readable "read" tag or transponder (identified in the Figures as "R"), and at least one infrastructure-mounted RFID-readable "no-read" tag or transponder (identified in the Figures as "NR"). The reader 22 and tags R and NR are mounted to the infrastructure of a location to define the read field. The reader 22 is adapted to both emit and receive signals. Ideally, the reader 22 will receive a return signal from the "read" tags R (indicating that the reader 22 is detecting the "read" tags R) and receive a "non-signal" from the "no-read" tags NR (indicating that the reader 22 is not construing the "no-read" tags NR as "read" tags R). The nature of the non-signal may take various forms including, but not limited to being in the form of no reading whatsoever detected by the reader 22 or a reading which is ignored by the reader 22 for failing to meet a particular threshold (e.g., a minimum RSSI level). The data returned to the reader 22 by a "no-read" tag NR may also contain a marker or other such information which is selectively filtered out by a system controller or otherwise identified and treated as a non-signal (as opposed to being treated as a return signal). In such a way, the infrastructure tags R and NR define the boundary of the read field.

One or more RFID-readable product or target tags 24 (FIG. 3) are present in and around the read field from time to time and can be detected by the reader 22 when they are in the field, but are not mounted to the infrastructure and do not comprise a permanent component of the read field. A more detailed description of a known RFID read field employing a reader, "read" tags, "no-read" tags, and product tags can be found in U.S. Pat. No. 6,486,769 to McLean, the disclosure of which is incorporated herein by reference.

The read field is dynamic because, during initial set-up as well as during normal use, at least one of the performance parameters of the reader 22 may be altered in response to a change or abnormal condition in the read field which causes the reader 22 to receive a return signal or non-signal which is different from what is expected (e.g., detecting a return signal instead of a non-signal from a "no-read" tag, failing to detect a return signal from a "read" tag, and/or otherwise receiving an abnormal reading from an infrastructure tag). Such performance parameters can include either the characteristics of the signal emitted by the antenna of the reader 22 (e.g., the power, frequency, phase, and/or amplitude of the signal) and/or its signal acceptance parameters (e.g., the RSSI level or the number of times a tag must be read for it to be considered readable). For example, if the reader 22 receives a return signal from a "no-read" tag NR, then one or more of the parameters of the reader 22 can be dynamically changed by the system controller so that the reader 22 does not receive the return signal (i.e., changing the parameters of the reader 22 until the "no-read" tag NR returns the expected non-signal). Similarly, if the reader 22 is not getting the expected return signal from a "read" tag R, then the characteristics of the signal and/or the emitted field shape can be dynamically changed by the signal controller so that the reader 22 does receive the expected return signal. In systems with more than one reader antenna, the parameters of the antennae may be unique (e.g., being driven at different levels and/or with differing phases) and the system controller capable of changing the parameters of the antennae individually as need be, effectively changing the shape of the read field dynamically.

Figure 3:
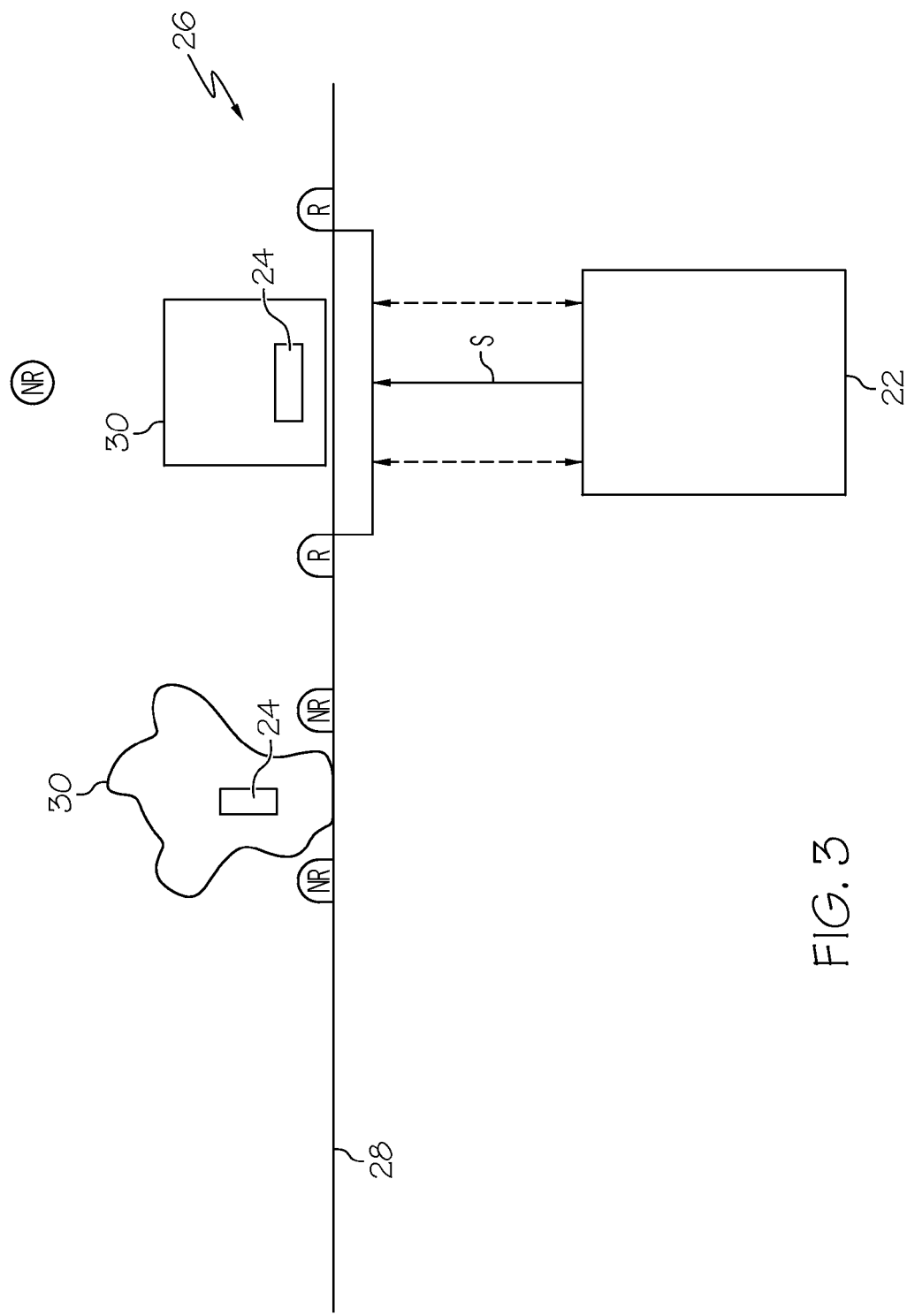
FIG. 3 is a schematic diagram of a dynamic RFID read field in a point-of-sale installation.

In the embodiment of FIG. 3, the read field is installed at a point-of-sale location, such as a check-out counter 26. The reader 22 is connected either directly or remotely to a system controller (not illustrated) and oriented so as to emit a signal S upwardly. A "no-read" tag NR is located generally above the reader 22 to define an upper bound of the read field. Additional "no-read" tags NR are installed on a conveyor surface 28 of the check-out counter 26 to ensure that the product tag 24 of an item 30 on the conveyor surface 28 is not read by the reader 22, otherwise the wrong customer could be charged for the item 30 or the customer could be charged twice for the same item.

Absent the dynamic adaptability of the present system, an object in the read field could distort the signals emitted and/or received by the reader 22 in such a way that the product tag 24 of the item 30 on the conveyor surface 28 (i.e., outside of the defined read field) is read. However, the dynamic characteristics of the present system would recognize such a situation and adapt at least one of the performance parameters of the reader 22 to enforce the status of the conveyor surface tags as "no-read" tags, thereby ensuring that the product tag 24 of the item 30 on the conveyor surface 28 is not read by the reader 22.

One way in which the performance parameters of the reader 22 may be adjusted is by adaptively reconfiguring its emission S so that it can detect the "read" tags R at the lowest possible power at which the "no-read" tags NR are not also detected. This prevents the reading of the product tag 24 of the item 30 on the conveyor surface 28.

Other adjustments may also be made in response to detecting a disrupting influence in the read field. For example, the system controller could be programmed to alert the cashier so that manual intervention, such as repositioning the item in the read field or using a short range handheld scanner, can be carried out.

In the embodiment of FIG. 4, the read field is installed at a portal 32, such as the entrance of a store. The reader 22 is connected either directly or remotely to a system controller (not illustrated) and oriented so as to emit a signal between an antenna 34 and an installation 36 of "read" tags R. One or more "no-read" tags NR are installed adjacent the portal 32. The direction of travel of an item through the read field is identified in FIG. 4 at T, so it will be seen that the item passes the illustrated "no-read" tags NR immediately before entering the read field. Additional "no-read" tags NR may be placed elsewhere (e.g., directly above the read field or on the far side of the read field) to further define the bounds of the read field. In theory, the system should work to read the product tags of items passing through the read field, but not items stacked around the portal 32. This may be useful in keeping an accurate count of the items entering a storage area.

Absent the dynamic adaptability of the present system, an object in the read field could distort the signals emitted and/or received by the reader 22 in such a way that the product tags of items adjacent to (but outside of) the read field are read. However, the dynamic characteristics of the present system would recognize such a situation and adapt at least one performance parameter of the reader to enforce the status of the tags on the entrance side and exit side of the portal 32 as "no-read" tags, thereby ensuring that the product tags of items adjacent to (but outside of) the read field are not read by the reader 22.

In one application, it is possible that the items being moved through the portal 32 (e.g., on a transport or carrier mechanism, such as a pallet) may block communication between certain "read" tags R and the reader 22. The system controller dynamically reconfigures the antenna to read as many of the "read" tags R as possible, while reading none of the "no-read" tags NR guarding the edges of the portal 32. In attempting to get a response from the blocked "read" tags R, a beneficial side effect is that the read rate for the product tags of the items passing through the read field will be optimized.

The embodiment of FIGS. 5 and 6 may be considered a variation of the read field of FIG. 4. Instead of establishing a read field at an entrance portal of a location, a read field is established at an exit portal of a retail location and the read field functions as a security system to prevent theft of items sold in the retail location. The read field of FIGS. 5 and 6 includes ceiling-mounted components (shown in FIG. 5) and floor-mounted components (shown in FIG. 6). In the illustrated embodiment, a reader 22 and one or more antennae 34 are mounted in a ceiling installation 38, with the antennae 34 oriented so as to direct their signals S at one or more floor locations 40 (FIG. 5).

At or adjacent to the floor locations 40 are mounted an array of "read" tags R and "no-read" tags NR. FIG. 6 illustrates a type of tag arrangement that can be utilized. This approach may be useful in detecting active product tags (i.e., product tags which have not been removed or deactivated by store personnel to indicate that the associated item has been paid for) passing through the read field, thereby preventing theft of merchandise.

Absent the dynamic adaptability of the present system, an object in the read field could scatter the signals emitted and/or received by the reader 22 in such a way that a product tag outside of the read field is read, resulting in a false alarm. However, the present system would dynamically adapt to a disturbing influence (e.g., a customer) entering the read field and automatically adjust at least one performance parameter of the reader 22 to minimize the chance of a false alarm. So adjusting the reader 22 has the additional benefit of maximizing the probability of detecting an active product tag in the read field.

The embodiment of FIGS. 5 and 6 may be variously configured without departing from the scope of the present disclosure. For example, the layout of the tag array of FIG. 6 is merely exemplary and other arrays may be employed. Additionally, rather than mounting the reader 22 and antennae 34 to the ceiling and the tags R and NR to the floor, the orientation may be varied, for example, with the reader 22 and antennae 34 secured to the floor and the tags R and NR secured to the ceiling.

Figure 7:
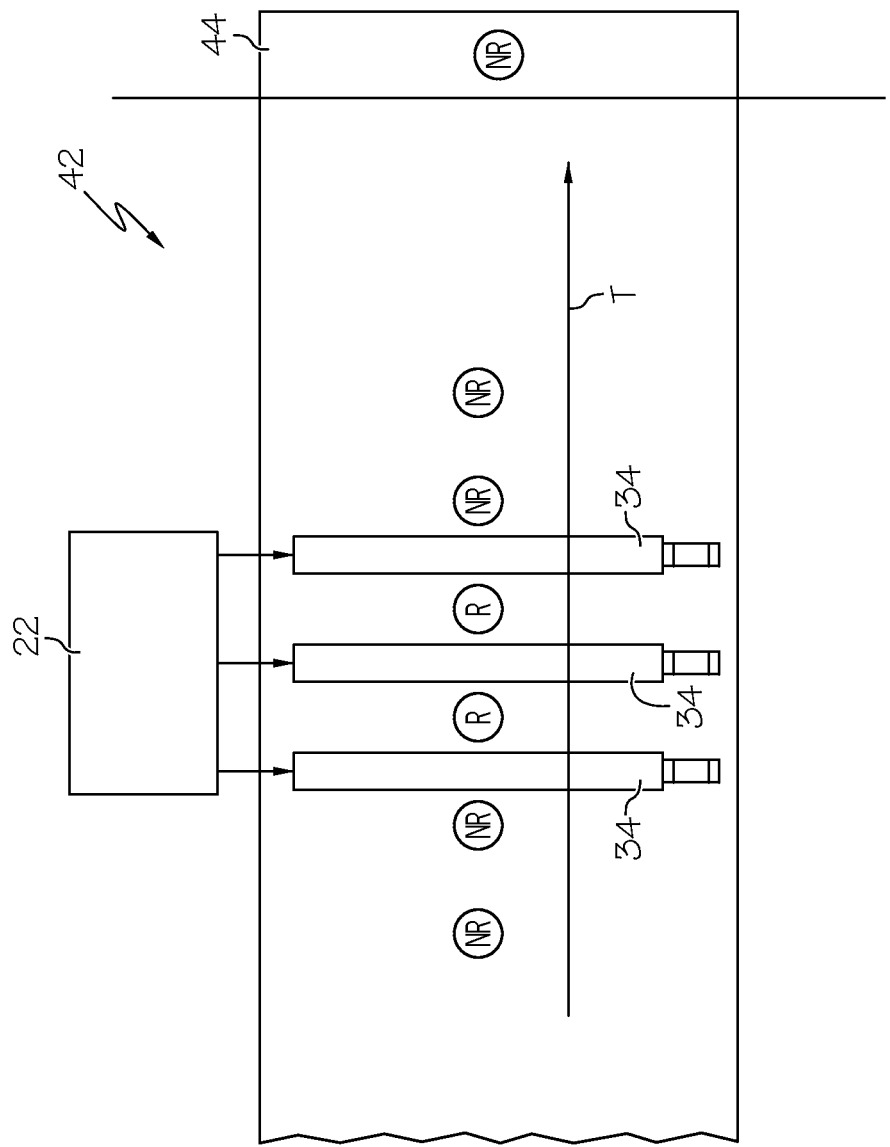
FIG. 7 is a schematic diagram of a dynamic RFID read field in an industrial installation.

In the embodiment of FIG. 7, the read field is employed in an industrial installation, such as an RFID label-printing device 42. The reader 22 is connected to a plurality of antennae 34 which are oriented as to emit a signal toward one or more "read" tags R (i.e., into the page in the orientation of FIG. 7) to define the read field. One or more "no-read" tags NR are positioned laterally of the "read" tags R to define the perimeter of the read field. The printing device 42 moves RFID labels from left to right (the direction of travel being identified at T) through the read field to an exit area 44. One or more additional "no-read" tags NR may be installed at the exit area 44 to ensure that an RFID label in the exit area 44 is not read by the read field.

In one embodiment, when an RFID label is located in the read field, an array of near field drivers dynamically reconfigures the read field to maximize the probability of only reading the target label and not an adjacent label. Hence, it will be appreciated that a dynamic read field according to the present disclosure allows for labels to be positioned closer together than was practicable using known methods. Further, the dynamic read field makes the printing device 42 more flexible, as the spacing of the labels may be adjusted without having to calibrate the read field, as the tag array automatically adjusts to establish the optimal state independent of the media passing through the read field.

While various read fields and applications are illustrated in FIGS. 3-7, it should be understood that these are merely exemplary and not exhaustive. Other dynamic read fields and applications may also be practiced without departing from the scope of the present disclosure. For example, a dynamic read field may include near field "read" tags in an area combined with far field "no-read" tags, constraining the system to produce, as far as possible, a near field-only emission even in the presence of a perturbing object.

Additionally, while it has been shown how dynamic read fields according to the present disclosure are advantageous during normal use, it will be understood that they are also useful during initial set-up, as the system will self-adjust when installed to adapt to its environment.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. An RFID-based read field, comprising:
an RFID reader adapted to emit a signal;
a plurality of RFID-readable infrastructure tags, wherein at least one of the infrastructure tags is adapted to emit a return signal upon receiving a signal from the RFID reader and at least one of the infrastructure tags is adapted to emit a non-signal or no reading upon receiving a signal from the RFID reader; and
a system controller associated with the RFID reader and programmed to compare any return signal or non-signal received by the RFID reader to an expected return signal, non-signal, or no reading and adjust at least one of the performance parameters of the RFID reader if the return signal or non-signal is different from the expected return signal or non-signal.

2. The RFID-based read field of claim 1 further comprising:
an RFID-readable product tag associated with a piece of merchandise.

3. The RFID-based read field of claim 2, wherein the system further comprises the RFID reader and the system controller associated with the RFID reader are programmed to determine the location of the product tag based on return signals received by the RFID reader from the product tag and the plurality of infrastructure tags.

4. The RFID-based read field of claim 3, wherein the system controller is programmed to determine the location of the product tag based on the times at which the RFID reader receives the return signals from the product tag and the plurality of infrastructure tags.

5. The RFID-based read field of claim 2, wherein the RFID reader and the system controller associated with the RFID reader are programmed to determine the location of the product tag based on return signals received by the RFID reader from the product tag and two or more of the infrastructure tags.

6. The RFID-based read field of claim 5, wherein the system controller is programmed to determine the location of the product tag based on times at which the RFID reader receives the return signals from the product tag and said two or more infrastructure tags.

7. The RFID-based read field of claim 2, wherein the RFID reader and the system controller associated with the RFID reader are programmed to require two or more of the infrastructure tags to be detected by the RFID reader in a particular sequence.

8. The RFID-based read field of claim 1, wherein the system controller is programmed to adjust the characteristics of the signal emitted by the RFID reader if the return signal or non-signal is different from the expected return signal or non-signal.

9. The RFID-based read field of claim 1, wherein the system controller is programmed to adjust the signal acceptance parameters of the RFID reader if the return signal or non-signal is different from the expected return signal or non-signal.

10. The RFID-based read field of claim 1, further comprising a plurality of RFID readers, wherein the system controller is programmed to adjust the performance parameters of the RFID readers independently of each other.

11. The RFID-based read field of claim 1, wherein at least one of the infrastructure tags is a near field tag adapted to emit a return signal upon receiving a signal from the RFID reader and at least one of the infrastructure tags is a far field tag adapted to emit a non-signal or no reading upon receiving a signal from the RFID reader.

12. The RFID-based read field of claim 1, wherein the infrastructure tags have different sensitivities.

13. The RFID-based read field of claim 1, wherein the infrastructure tags have different radiation patterns.

14. The RFID-based read field of claim 1, wherein the infrastructure tags contain information which cooperates with the RFID reader and system controller to dictate a particular order in which the infrastructure tags must be read.

15. A method of operating an RFID-based read field, comprising:
providing plurality of RFID-readable infrastructure tags;
providing an RFID reader;
emitting a signal from the RFID reader;

emitting a return signal, non-signal, or no reading from the tag if the tag receives said signal from the RFID reader;

comparing any return signal, non-signal, or no reading received by the RFID reader to an expected return signal, non-signal, or no reading; and adjusting at least one performance parameter of the RFID reader if the return signal, non-signal, or no reading is different from the expected return signal, non-signal, or no reading.

16. The method of claim 15, wherein the method further comprises providing an item including an RFID-readable product tag;

scanning said product tag using the RFID reader to obtain information about the product tag; and scanning said infrastructure tags with an RFID reader to obtain information about the infrastructure tag wherein the plurality of infrastructure tags are associated with different fixed locations and have unique identities; and said scanning said infrastructure tags includes scanning two or more of said plurality of infrastructure tags to obtain information about said two or more of said infrastructure tags.

17. The method of claim 16, further comprising using the information obtained by scanning the product tag and said infrastructure tags to determine the location of the product tag.

18. The method of claim 16, further comprising recording the times at which the product tag and the infrastructure tags are scanned with the RFID reader and determining the location of the product tag based on said times.

19. The method of claim 16, further comprising using the information obtained by scanning the product tag and said two or more of said infrastructure tags to determine the location of the product tag.

20. The method of claim 16, further comprising recording the times at which the product tag and said two or more of said infrastructure tags are scanned with the RFID reader and determining the location of the product tag based on said times.

21. The method of claim 15, further comprising providing a system controller associated with the RFID reader and programmed to require two or more of the infrastructure tags to be scanned in a particular sequence.

22. The method of claim 15, wherein said adjusting at least one performance parameter of the RFID reader includes adjusting the characteristics of the signal emitted by the RFID reader if the return signal, non-signal, or no reading is different from the expected return signal or non-signal.

23. The method of claim 15, wherein said adjusting at least one performance parameter of the RFID reader includes adjusting the signal acceptance parameters of the RFID reader if the return signal, non-signal, or no reading is different from the expected return signal or non-signal.

24. The method of claim 15, wherein said providing an RFID reader includes providing a plurality of RFID readers and said adjusting at least one performance parameter of the RFID reader includes adjusting at least one performance parameter of one or more of the RFID readers independently of each other.

25. The method of claim 15, wherein said providing a plurality of RFID-readable infrastructure tags includes providing at least one RFID-readable infrastructure tag adapted to emit a return signal upon receiving a signal from the RFID reader and at least one RFID-readable infrastructure tag adapted to emit a non-signal or no reading upon receiving a signal from the RFID reader.

26. The method of claim 15, wherein said providing an RFID-readable infrastructure tag includes providing at least one RFID-readable near field infrastructure tag adapted to emit a return signal upon receiving a signal from the RFID reader and at least one RFID-readable far field infrastructure tag adapted to emit a non-signal or no reading upon receiving a signal from the RFID reader.

\* \* \* \* \*